(12) United States Patent
Ungefug

(10) Patent No.: US 6,610,412 B2
(45) Date of Patent: Aug. 26, 2003

(54) PRINTING FLUID ADDITIVES PROMOTING OVERCOAT ADHESION

(75) Inventor: Gary Allan Ungefug, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/261,742

(22) Filed: Sep. 30, 2002

(65) Prior Publication Data

US 2003/0119973 A1 Jun. 26, 2003

Related U.S. Application Data

(62) Division of application No. 09/694,726, filed on Oct. 23, 2000, now abandoned.

(51) Int. Cl.$^7$ .................................................. B32B 27/08
(52) U.S. Cl. ...................... 428/520; 524/706; 524/710; 526/264; 526/265; 526/274; 526/287; 526/288; 526/303.1; 526/304; 526/307.6; 526/307.7; 526/328.5; 526/329.2
(58) Field of Search ................................. 524/706, 710; 526/264, 265, 274, 287, 288, 303.1, 304, 307.6, 307.9, 328.5, 329.2, 520

(56) References Cited

U.S. PATENT DOCUMENTS

| | | |
|---|---|---|
| 4,597,794 A | 7/1986 | Ohta et al. |
| 4,738,555 A | 4/1988 | Nagashima |
| 5,082,757 A | 1/1992 | Keoshkerian et al. |
| 5,461,125 A | 10/1995 | Lu et al. |
| 5,555,011 A | 9/1996 | Tang et al. |
| 5,612,777 A | 3/1997 | Malhotra |
| 5,656,071 A | 8/1997 | Kappele et al. |
| 5,847,738 A | 12/1998 | Tutt et al. |
| 5,906,905 A | 5/1999 | Malhotra |
| 5,954,906 A | 9/1999 | Abe et al. |
| 6,057,384 A | 5/2000 | Nguyen et al. |
| 6,124,376 A | 9/2000 | Nichols et al. |
| 6,127,452 A | 10/2000 | Kato |
| 6,258,888 B1 | 7/2001 | Peters et al. |

FOREIGN PATENT DOCUMENTS

| | | |
|---|---|---|
| EP | 1035179 A1 | 9/2000 |
| WO | WO 99/23181 | 5/1999 |
| WO | WO 99/23183 | 5/1999 |

*Primary Examiner*—Helen L. Pezzuto
(74) *Attorney, Agent, or Firm*—W. Bradley Haymond

(57) ABSTRACT

A printing fluid composition with an additive which functions as a compatibilizer between the hydrophilic material coating a media surface and the hydrophobic thermal transfer overcoat (TTO) material used in a clear protective TTO overcoat and a method of using such an printing fluid composition to promote adhesion of such TTO material and a digitally printed medium.

59 Claims, No Drawings

PRINTING FLUID ADDITIVES PROMOTING OVERCOAT ADHESION

CROSS REFERENCE TO RELATED APPLICATIONS

This is a divisional of application Ser. No. 09/694,726 filed on Oct. 23, 2000, now abandoned which is hereby incorporated by reference herein.

FIELD OF INVENTION

The invention relates to a printing fluid additive which functions as a compatibilizer between the hydrophilic material coating a media surface and the hydrophobic thermal transfer overcoat (TTO) material used in a clear protective TTO overcoat.

BACKGROUND OF THE INVENTION

The use of digital printing systems has grown dramatically in recent years. This growth may be attributed to substantial improvements in print resolution and overall print quality coupled with appreciable reduction in cost. Today's digital printers offer acceptable print quality for many commercial, business, and household applications at costs fully an order of magnitude lower than comparable products available just a few years ago. Notwithstanding their recent success, intensive research and development efforts continue toward improving digital printer print quality, while further lowering cost to the consumer.

In a digital inkjet printer, an inkjet image is formed when a precise pattern of dots is ejected from a drop-generating device known as a "printhead" onto a printing medium.

Such inkjet images can be formed by either a thermal inkjet or piezoelectric inkjet system. In addition to inkjet, other systems also produce digital printed images. For example, electrostatic (laser) or electroacoustic printers are also used in to produce digital printed images.

The need exists to protect and stabilize digital printed images against, for example, scratch, abrasion, and water damage and against unwanted retransfer of ink from the digital printed image to other surfaces.

Tutt & Tunney (U.S. Pat. No. 5,847,738, issued on Jan. 8, 1999 and assigned to Eastman Kodak Co.) disclose a process for applying a protective overcoat on a digitally printed media. The protective overcoat is obtained through:

a) Charging the printed imaged element to a given polarity or applying a voltage across the surface of the element which is attracted to a conductive surface behind the element;

b) Applying colorless charged particles to the imaged element which causes them to be electrostatically attracted to the surface of the image layer; and c) Heat-fusing the particles to obtain a protective overcoat over the entire surface of the image layer.

Colorless toner particles well-known in electrophotography are used in the coating process of Tutt & Tunney. Examples of materials mentioned in the patent are: chlorinated polyolefins, polyacrylic acid esters, cellulose derivatives, modified alkyd resins, polyesters, polyurethanes, poly(vinyl acetate), polyamides, ketone resins, polyvinylbutyral, copolymers of vinyl polymers with methacrylates or acrylates, low molecular weight polyethylene, copolymers with siloxanes, polyalkenes, and poly(styrene-co-butyl acrylate), etc.

Nagashima (U.S. Pat. No. 4,738,555 assigned to Toshiba) discloses the use of a thermal print ribbon to thermally transfer and laminate a transparent protective layer of wax, vinyl chloride, vinyl acetate, acrylic resin, styrene or epoxy on the printed image portion of a record substrate.

Tang et al. (U.S. Pat. No. 5,555,011 assigned to Eastman Kodak) disclose a method of laminating, using a thermally-transferable polymeric material, a transparent protective layer over an ink-printed image on a substrate.

Abe et al. (U.S. Pat. No. 5,954,906 assigned to Canon) discloses a method for protecting and covering a printed material on a substrate with a pressure-sensitive transferring protective covering material with at least (a) a first flexible substrate, (b) an adhesive layer, (c) a solid resin layer, and (d) a second flexible substrate, stacked in this order.

Malhotra (U.S. Pat. No. 5,612,777 assigned to Xerox) discloses a method of applying a clear, scratch-resistant, lightfast coating for a substrate having photocopied color images by first, depositing color toner images on a charge retentive surface; second, depositing a clear polymer toner material onto the charge retentive surface; and third, fusing the color toner images and clear polymer toner material onto a substrate.

Another Malhotra patent (U.S. Pat. No. 5,906,905 assigned to Xerox) discloses a method of creating photographic quality digital prints using imaging such as xerography or ink jet by, first, reverse reading toner images on a transparent substrate and then adhering the transparent substrate to a coated backing sheet, coated with a polymeric lightfastness material.

Typically, clear toner materials currently used in the industry are based on a few basic polymer types. In the table below are listed the advantages and disadvantages of these materials when used as an overcoat for digital printed images:

| Toner based on: | Advantages | Disadvantages |
| --- | --- | --- |
| Styrenated Acrylics | Good Elasticity & Toughness | Poor Fusability (high softening temperature); Poor gloss and clarity |
| Low MW Polyesters | Low melting temperature; low melt viscosity; good clarity; fair gloss | Very poor mechanical properties (no flexibility and abrasion resistance); poor resistance to digital printer ink solvents |
| Polyolefins | Good fusibility; good elasticity | Poor abrasion resistance; Poor clarity and gloss; waxy feel |

Core/shell polymers are well-known; such polymers typically have a hydrophilic portion and a hydrophobic portion comprising a latex particle morphology consisting of an inner "core", surrounded by an outer "shell". Core/shell polymers are commonly used to disperse molecules or particles, such as pigments, which are ordinarily insoluble in water, but which, after association with the core/shell polymer, form stable dispersions in water. Encapsulation occurs when the hydrophobic portion of the polymer associates with the water-insoluble molecule, and the hydrophilic portion of the polymer disperses with water.

U.S. Pat. No. 4,597,794 discloses the dispersion of pigments in an aqueous vehicle, using aqueous binders comprising both hydrophilic and hydrophobic components. The dispersion of the pigment is followed by centrifugation to eliminate the non-dispersed components such as agglomerates. Examples of the hydrophilic component comprise polymers of monomers having a mainly additively polymerizable vinyl group, into which hydrophilic construction portions such as carboxylic acid groups, sulfonic acid groups, sulfate groups, etc. are introduced by using a predetermined amount of an alpha, beta-unsaturated monomer such as acrylic acid, methacrylic acid, crotonic acid, itaconic acid, itaconic acid monoester, maleic acid, maleic acid monoester, fumaric acid, fumaric acid monoester, vinyl sulfonic acid, sulfoethyl methacrylate, sulfopropyl methacrylate, sulfonated vinylnaphthalene, etc. Examples of the hydrophobic portion comprise polymers of monomers selected from the group consisting of styrene, styrene derivatives, vinylnaphthalene, vinylnaphthalene derivatives, and alpha, beta-ethylenic unsaturated carboxylate of aliphatic alcohol having C8–C18. In addition to the foregoing monomers, also included are acrylonitrile, vinylidene chloride, alpha, beta-ethylenic unsaturated carboxylate, vinyl acetate, vinyl chloride, acrylamide, methacrylamide, hydroxyethyl methacrylate, hydroxypropyl methacrylate, glycidyl methacrylate, N-methylol acrylamide, N-butoxymethyl acrylamide, etc.

U.S. Pat. No. 5,082,757 discloses encapsulated toner compositions comprising a core and a hydroxylated polyurethane microcapsule shell derived from the polycondensation of a polyisocyanate and a water soluble carbohydrate. The core comprises a polymer binder, pigment, dye, or mixtures thereof. Examples of the polymer binder include polymerized monomers selected from the group consisting of acrylates, methacrylates, and olefins including styrene and its derivatives.

U.S. Pat. No. 5,461,125 discloses waterborne core-shell latex polymers useful as adhesive films, rather than superdispersion stability. The core comprises a (co)polymer comprising a (meth)acrylate ester, while the shell comprises a copolymer, the copolymer comprising (1) a nitrogen-bearing ethylenically-unsaturated free-radically polymerizable monomer, (2) at least one (meth)acrylate ester of about a $C_1$ to $C_{14}$ alcohol, and (3) an optional ethylenically-unsaturated free-radically polymerizable silane monomer, wherein the nitrogen-bearing ethylenically-unsaturated free-radically polymerizable monomer comprises about 15 to 60 wt % of the shell and wherein the core comprises about 40 to 85 wt % of the weight of the total core-shell latex particle. The polymers obtained by practicing the teachings of the disclosure have molecular weights of 400,000 or more, and the total low $T_g$ component (less than −10° C.), where $T_g$ is the glass transition temperature, is greater than 60 wt %.

U.S. Pat. No. 5,656,071 discloses ink compositions useful for ink-jet applications. These compositions include an insoluble pigment and a polymeric dispersant. In one embodiment, the polymeric dispersant comprises block or graft copolymers comprising a hydrophilic polymeric segment (particularly an acrylate or methacrylate copolymer) and a hydrophobic polymeric segment which includes a hydrolytically stable siloxyl substituent.

Heretofore, ink-jet printers have not had printing performance and durable print properties of competitive printer technologies. The foregoing cited patents do not provide for useful, durable film-forming properties upon removal of the water or solvent. Film durability includes wet and dry rub resistance, highlighter smear-fastness, light-fastness, and waterfastness (e.g., hot and cold water, under spill, soak, and rub conditions).

In particular, formulating an ink-jet ink often involves compromising competing interests. For example, it is possible to enhance one property, such as durable film-forming of the colorant.

However, such enhancement usually results in the degradation of another property, such as printing stability associated in thermal inkjet with resistor fouling or nozzle clogging (kogation or decap-nozzle crusting).

SUMMARY OF THE INVENTION

The present invention relates to an printing fluid composition comprising an acrylic copolymer in an amount sufficient to promote adhesion of clear thermal transfer overcoat applied over a digitally printed image on media having a hydrophilic coating.

Furthermore in a preferred embodiment of the above-described printing fluid composition, the acrylic copolymer is derived from at least one hydrophilic monomer and at least one hydrophobic monomer, the acrylic copolymer having a formula $$\{(A)_m(B)_n(C)_p(E)_r\}_y$$

wherein A, B, C, and E are monomers as follows

A=at least one hydrophobic component contributing to improved durable, film-forming properties selected from moieties which, when homo-polymerized to a solid state, have a glass transition temperature ($T_g$) in the range between −150° and +25° C.;

B=at least one hydrophobic and solvent barrier moiety used to adjust the $T_g$ of the hydrophobic component of the polymer which, when homopolymerized to a solid state, has a $T_g$ greater than +25° C.;

C=at least one hydrophilic component comprising a water-soluble monomer;

E=at least one moiety having at least one highly polar functional group;

and where m, n, p and r are as follows:
m=0 to 90 wt %;
n=0 to 90 wt %;
p=0 to 90 wt %;
r=0 to 90 wt %;
m+n+p+r=100wt %; and
y=1 to 100,000.

In addition, the present invention relates to a method of using adhesion promoters in printing fluids to improve adhesion of clear thermal transfer overcoats to hydrophilic coated medium, comprising (a) printing a printing fluid composition comprising an acrylic copolymer additive onto a medium having a hydrophilic coating; and (b) applying a clear thermal transfer overcoat to the medium printed in step (a);

wherein the acrylic copolymer additive in the printing fluid composition is in an amount sufficient to promote adhesion of clear thermal transfer overcoat applied over an image printed with the printing fluid composition.

Furthermore, in preferred embodiment of the above-described method, the acrylic copolymer is derived from both a hydrophilic monomer and a hydrophobic monomer, the acrylic copolymer having a formula $$\{(A)_m(B)_n(C)_p(E)_r\}_y$$

wherein A, B, C, and E are monomers as follows

A=at least one hydrophobic component contributing to improved durable, film-forming properties selected from moieties which, when homo-polymerized to a solid state, have a glass transition temperature ($T_g$) in the range between −150° and +25° C.;

B=at least one hydrophobic and solvent barrier moiety used to adjust the $T_g$ of the hydrophobic component of the polymer which, when homopolymerized to a solid state, has a $T_g$ greater than +25° C.;

C=at least one hydrophilic component comprising a water-soluble monomer;

E=at least one moiety having at least one highly polar functional group;

and where m, n, p and r are as follows:
- m=0 to 90 wt %;
- n=0 to 90 wt %;
- p=0 to 90 wt %;
- r=0 to 90 wt %;
- m+n+p+r=100 wt %; and
- y=1 to 1 00,000.

DETAILED DESCRIPTION OF THE INVENTION

If a layer or layers of clear thermoplastic material could be applied to digitally printed media in the form of a clear hydrophobic thermal transfer overcoat (TTO), such a TTO would protect the media from the effects of water, humidity, dirt, stains, organic solvents, etc. It also would allow the color qualities of the inks in the printed images to last for a longer period of time than those printed images on a printed medium which is unprotected and directly exposed over time to air, light, changes of temperature, etc. These potential protective and preservative effects of clear hydrophobic TTO on digitally printed media notwithstanding, it has been found that, because of its hydrophobicity, TTO does not adhere well either to the hydrophilic materials, such as, for example, gelatin, polyvinyl alcohol, swellable coating and other hydrophilic materials used to coat the media surface itself or to the digital printer ink-printed images which are applied to the media surface. This is because the digital printer inks used in the printed images and the coating materials used on the media surface are both predominantly hydrophilic, thus adhering well to each other but not to the hydrophobic material used in the clear TTO. Because of this problem of poor adherence between the hydrophobic TTO coatings and the hydrophilic digital-printer inks and media coatings, clear TTO overcoatings have not been found workable to protect digitally printed media. When hydrophobic thermal transfer overcoating is applied to such digitally printed media, the poor adhesion of the overcoating to the hydrophilic ink and/or media coating results in an overcoat which cracks, flakes and can eventually peel off totally from the medium.

It is usually the case in digital printing on hydrophilic material-coated media, that there are virtually no areas of the media left uncovered by digitally printed ink images. Thus, if a digital printer ink were developed which was compatible and adherent with both hydrophilic material-coated media and hydrophobic clear thermal transfer overcoat, the protective, preservative qualities of clear TTO could be utilized with these digitally printed photographs. Thus in one embodiment, the digital printing fluid of the present invention is an ink, the digital printing fluid of the present invention further comprising colorant material. In another embodiment, the digital printing fluid has no colorant and is applied to the media, either alone without ink or separately from the ink. In any case, the compatibilizing additive of the printng fluid ends up between the media coating and the thermal transfer overcoat, When applied to a media in the printing fluid, with or without ink colorant, the additive in the digital printing fluid allows the hydrophilic material-coated media to be compatible and adherent with the hydrophobic clear thermal transfer overcoating. In a preferred embodiment, this printing fluid additive compatibilizer allows images digitally printed on media to obtain the significant protective and preservative benefits of a clear TTO overcoating.

Acrylic Copolymer Printing Fluid Additives

Monomers

The acrylic copolymers used in the presently claimed invention are derived from at least one hydrophilic portion and at least one hydrophobic portion and have the following general structure given by the formula

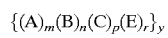

wherein A, B, C, and E are monomers as follows

A=at least one hydrophobic component contributing to improved durable, film-forming properties selected from moieties which, when homo-polymerized to a solid state, have a glass transition temperature ($T_g$) in the range between −150° and +25° C.;

B=at least one hydrophobic and solvent barrier moiety used to adjust the $T_g$ of the hydrophobic component of the polymer which, when homopolymerized to a solid state, has a $T_g$ greater than +25° C.;

C=at least one hydrophilic component comprising a water-soluble monomer;

E=at least one moiety having at least one highly polar functional group;

and where m, n, p and r are as follows:
- m 0 to 90 wt %, preferably 10 to 60 wt %, and more preferably 15 to 50 wt %;
- n=0 to 90 wt %, preferably 10 to 60 wt %, and more preferably 15 to 50 wt %;
- p=0 to 90 wt %, preferably 10 to 60 wt %, and more preferably 15 to 50 wt %;
- r=0 to 90 wt %, preferably 0.01 to 60 wt %, and more preferably 1 to 40 wt %;
- m+n+p+r=100wt %; and
- y=1 to 100,000, preferably 10 to 10,000, and more preferably 100 to 1,000.

Preferably, either m or n is non-zero.

The molecular weight (weight average) of the acrylic copolymer is between about 100 and 2,000,000, preferably between about 1,000 and 500,000, and most preferably between about 5,000 and 300,000.

The $T_g$ of the acrylic copolymers is within the range of about −100° to +100° C., preferably within the range of about −30° to +30° C., and more preferably within the range of about 0° to +30° C.

The molecular weight (weight average) of the acrylic copolymer is between about 1,000 and 2,000,000, preferably between about 5,000 and 500,000, and most preferably between about 10,000 and 70,000.

The copolymer of the present system is designed to have both hydrophobic and hydrophilic moieties. It can also be associated with one or more surfactants to form a polymer/surfactant system. Thus, the polymer or polymer/surfactant system is both (1) water-dispersible, and includes water-soluble polar groups, which are present in sufficient quantity to suspend a pigment particle, and (2) hydrophobic, with a substantial fraction of the polymer containing hydrophobic moieties that are either highly water-resistant or even water-insoluble.

The hydrophobic A moiety allows the copolymer to have a $T_g$ sufficient to permit formation of a film with other copolymer molecules containing the A moiety. The film formation results upon drying (removal of water).

The hydrophobic B moiety in combination with the hydrophobic A moiety provide the copolymer with resistance to environmental solvents, such as water and those found in highlighter pens. Additional environmental solvents can be found in rain, coffee, soda pop, body oils, soils, hot water, etc.

The hydrophilic C moiety may be provided in the copolymer itself, as shown in the formula. At least one C moiety may be present, and is water-soluble. Alternatively, the C moiety may be provided by one or more surfactants, to form a polymer/surfactant system. Any of the ionic (anionic and cationic), non-ionic, and zwitterionic (amphoteric) surfactants may be employed. A representative listing of applicable surfactant can be found in McCutcheon's Emulsifiers and Detergents, North American Edition, 1997, McCutcheon's Division, MC Publishing Co. 175 Rock road, Glen Rock, N.J. 07452 USA Examples of surfactants that may be beneficially employed in the practice of the present invention include: TERGITOLs, which are polyethylene or polypropylene oxide ethers; alkyl phenyl polyethylene oxides available under the tradename TRITONs,; BRIJs, which are polyethylene or polypropylene oxide ethers; PLURONICs, which are also polyethylene/o polypropylene oxide copolymers from BASF; and the SURFYNOLs, which are acetylenic ethoxylated diols; polyethylene oxide (POE) esters; POE diesters; POE amines; protonated POE amines; POE amides; the polypropylene analogs of the foregoing POE compounds; dimethicone copolyols; quaternary ammonium compounds; AEROSOLS, including sulfosuccinates; ethoxylates, amine oxides, and betaines.

Preferred examples of non-ionic surfactants include, but are not limited to, BRIJs, which are polyethylene oxide ethers, available from ICI Surfactants (specific examples include the following BRIJs: 30, 35, 52, 56, 58, 72, 76,78, 92, 97, and 98); TWEENs, which are derivatives of polyethylene oxides, available from ICI Surfactants (specific examples include the following TWEENs: 20, 40, 60, 80, and 85); SOLSPERSE 27,000, which is an aromatic ethoxylate, available from Avecia; SPAN 85, which is available from Air Products; and SURFYNOLs, which are acetylenic ethylene oxides available from Air Products. Examples of anionic surfactants include AEROSOL DPOS 45, which is a sulfate, available from Cytec Industries; sodium octadecyl sulfonate; dioctyl ester of sodium sulfosuccinic acid; AEROSOL OT 100%, which is a sulfate, available from American Cyanamid; and sodium lauryl sulfonate. If used, the amount of surfactant ranges from about 0.001 to 30 wt %, and the balance the polymer.

Also optionally, one or more ionic water-soluble moieties E may be present.

One monomer may be employed to provide one or more of the foregoing functions. Alternatively, one function may be provided by one or more of the foregoing moieties. However, in many instances, a single monomer provides a single function.

The copolymer(s) of the present invention is prepared by emulsifying the monomeric components, and then conducting a free-radical polymerization in water. Free-radical polymerization involves employing a free-radical initiator. A concentration of about 0.001 to 10 wt % of the initiator is employed in the total monomer system. Examples of suitable free-radical initiators include, but are not limited to, ammonium persulfate, potassium persulfate, hydrogen peroxide, benzoyl peroxide, azobisisobutyronitrile, TRIGONOX 21, and PERKADOX 16. In one possible embodiment, the resulting copolymer is a random copolymer. In another possible embodiment, the resulting copolymer is a block copolymer.

One skilled in this art would understand that the copolymer(s) can also be prepared by conventional condensation techniques. Once a film is formed from the copolymer and water is removed, as by dehydration under ambient conditions, the film is essentially impervious to water, and the copolymer is not capable of being redispersed with water. If the copolymer or copolymer/surfactant system is associated with pigment particles, and the pigment with copolymer or copolymer/surfactant system is deposited on a surface, such as paper, then the pigment particles are trapped within or beneath the film on the surface, and are thus protected from the effects of water and environmental solvents.

As stated above, the A moiety is a hydrophobic component for controlling solubility in organic solvents selected from monomer(s) that form homopolymers having a $T_g$ in the range between $-150°$ and $+25°$ C. The A moiety is preferably selected from ethylenically-substituted compounds given by (A):

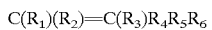

$$C(R_1)(R_2)=C(R_3)R_4R_5R_6$$

where $R_1$ and $R_2$ are independently hydrogen, halogen, alkyl, aryl, or substituted alkyl or aryl;

$R_3$ is hydrogen, halogen, saturated or unsaturated alkyl, alkoxy, aryl, or substituted alkyl, alkoxy, or aryl, $R_4$ is direct bond, O, CO, NH, halogen, saturated or unsaturated alkyl, aryl, or substituted alkyl, aryl, or CN, $R_5$ is absent (if $R_4$ is alkyl, aryl, or substituted alkyl or aryl), direct bond, hydrogen, NH, O, alkyl, alkylene, aryl, or substituted alkyl, alkylene, or aryl, and $R_6$ is absent (if $R_4$ is alkyl, aryl, or substituted alkyl or aryl or if $R_5$ is hydrogen, alkyl, aryl, or substituted alkyl or aryl), $NH_2$, saturated or unsaturated alkyl, alkoxy, aryl, aroxy, or substituted alkyl or aryl.

The alkyl, alkoxy, alkylene, and aryl chains each contain more than one carbon atom and less than 40 carbon atoms. Preferably, the $R_4$ functionality is an electron acceptor moiety.

One preferred embodiment of formula (A) is the following general structure (A1):

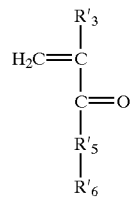

where $R'_3$=H, halogen, alkyl, aryl or substituted alkyl or aryl;

$R'_5$=direct bond, O, or NH; and $R'_6$=alkyl, substituted alkyl, alkylaryl or substituted alkylaryl and aralkyl in which the length of alkyl, alkylaryl or aralkyl chain is given as the number of C atoms between 2 and 18; and alkyl or aryl siloxanes.

Examples for structure (A1) include, but are not limited to:

(A1-1) ethyl acrylate;
(A1-2) ethyl methacrylate;
(A1-3) benzyl acrylate;
(A1-4) benzyl methacrylate;
(A1-5) propyl acrylate;
(A1-6) propyl methacrylate;
(A1-7) iso-propyl acrylate;

(A1-8) iso-propyl methacrylate;
(A1-9) butyl acrylate;
(A1-10) butyl methacrylate;
(A1-11) hexyl acrylate;
(A1-12) hexyl methacrylate;
(A1-13) octadecyl methacrylate;
(A1-14) octadecyl acrylate;
(A1-15) lauryl methacrylate;
(A1-16) lauryl acrylate;
(A1-17) hydroxyethyl acrylate;
(A1-18) hydroxyethyl methacrylate;
(A1-19) hydroxyhexyl acrylate;
(A1-20) hydroxyhexyl methacrylate;
(A1-21) hydroxyoctadecyl acrylate;
(A1-22) hydroxyoctadecyl methacrylate;
(A1-23) hydroxylauryl methacrylate;
(A1-24) hydroxylauryl acrylate;
(A1-25) phenethyl acrylate;
(A1-26) phenethyl methacrylate;
(A1-27) 6-phenylhexyl acrylate;
(A1-28) 6-phenylhexyl methacrylate;
(A1-29) phenyllauryl acrylate;
(A1-30) phenyllauryl methacrylate;
(A1-31) 3-nitrophenyl-6-hexyl methacrylate;
(A1-32) 3-nitrophenyl-18-octadecyl acrylate;
(A1-33) ethyleneglycol dicyclopentyl ether acrylate;
(A1-34) vinyl ethyl ketone;
(A1-35) vinyl propyl ketone;
(A1-36) vinyl hexyl ketone;
(A1-37) vinyl octyl ketone;
(A1-38) vinyl butyl ketone;
(A1-39) cyclohexyl acrylate;
(A1-40) 3-methacryloxypropyldimethylmethoxysilane;
(A1-41) 3-methacryloxypropylmethyldimethoxysilane;
(A1-42) 3-methacryloxypropylpentamethyldisiloxane;
(A1-43) 3-methacryloxypropyltris(trimethylsiloxy) silane;
(A1-44) 3-acryloxypropyldimethy,methoxysilane;
(A1-45) acryloxypropyhlethyldimethoxysilane;
(A1-46) trifluoromethyl styrene;
(A1-47) trifluoromethyl acrylate;
(A1-48) trifluoromethyl methacrylate;
(A1-49) tetrafluoropropyl acryl ate;
(A1-49) tetrafluoropropyl methacrylate;
(A1-51) heptafluorobutyl methacrylate;
(A1-52) iso-butyl acrylate;
(A1-53) iso-butyl methacrylate;
(A1-54) 2-ethylhexyl acrylate;
(A1-55) 2-ethylhexyl methacrylate;
(A1-56) iso-octyl acrylate; and
(A1-57) iso-octyl methacrylate.

Another preferred embodiment for formula (A) is the following general structure (A2):

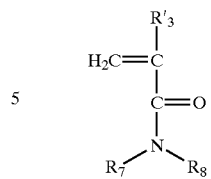

where
R'3=same definition as that of structure (A1) above; and
R7=R8 same or different combinations of R'6 in structure (A1) above.

An example for structure (A2) includes, but is not limited to:
(A2-1) N,N-dihexyl acrylamide; and
(A2-2) N,N-dioctyl acrylamide.

Yet another preferred embodiment for formula (A) is the following general structure (A3):

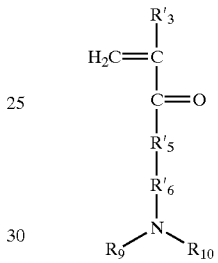

where R'3=same definition as that of structure (A1);
R'5=same definition as that of structure (A1);
R'6=alkylene, arylene, substituted alkylene or arylene; and
R9 and R10 are independently selected from H, alkyl, substituted alkyl, alkylaryl or substituted alkylaryl in which the length of alkyl and alkylaryl chains each comprise between 2 and 40 carbon atoms. Alternatively, R9 and R10 together may form a 5- or 6-membered ring.

Examples for structure (A3) include, but are not limited to:
(A3-1) aminoethyl acrylate;
(A3-2) aminopropyl acrylate;
(A3-3) aminopropyl methacrylate;
(A3-4) aminoisopropyl acrylate;
(A3-5) aminoisopropyl methacrylate;
(A3-6) aminobutyl acrylate;
(A3-7) aminobutyl methacrylate;
(A3-8) aminohexyl acrylate;
(A3-9) aminohexyl methacrylate;
(A3-10) amino octadecyl methacrylate;
(A3-11) aminooctadecyl acrylate;
(A3-12) aminolauryl methacrylate;
(A3-13) aminolauryl acrylate;
(A3-14) N,N-dimethylaminoethyl acrylate;
(A3-15) N,N-dimethylaminoethyl methacrylate;
(A3-16) N,N-diethylaminoethyl acrylate;
(A3-17) N,N-dimethylaminoethyl methacrylate; and
(A3-18) piperidino-N-ethyl acrylate.

Still another preferred embodiment for formula (A) is the following general structure (A4):

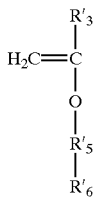

where:

R'3=H, halogen, alkyl, aryl, substituted alkyl or aryl;

R'5=direct bond, CO, alkylene, arylene, substituted alkylene or arylene; and

R'6=alkyl, aryl, substituted alkyl or aryl.

Examples for structure (A4) include, but are not limited to:

(A4-1) vinyl propionate;
(A4-2) vinyl acetate;
(A4-3) vinyl butyrate;
(A4-4) vinyl butyl ether;
(A4-5) vinyl propyl ether;
(A4-6) vinyl neodecanoate;
(A4-7) vinyl neononate and
(A4-8) vinyl pivalate.

As stated above, the B moiety is hydrophobic and is a solvent barrier composed of monomer(s) that form homopolymers having a $T_g$ greater than 25° C. The B moiety has the general structure given by formula (B)

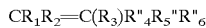

where $R_1$ and $R_2$ are independently hydrogen, or halogen;

$R_3$ is hydrogen, halogen, saturated or unsaturated alkyl, alkoxy, aryl, or substituted alkyl, alkoxy, or aryl, $R_4$ is direct bond, O, CO, NH, halogen, saturated or unsaturated alkyl, aryl, or substituted alkyl, aryl, or CN, $R_5$ is absent (if $R_4$ is CN, alkyl, aryl, or substituted alkyl or aryl), direct bond, hydrogen, NH, O, alkyl, alkylene, aryl, or substituted alkyl, alkylene, or aryl, and $R_6$ is absent (if $R_4$ is alkyl, aryl, or substituted alkyl or aryl or if $R_5$ is hydrogen, alkyl, aryl, or substituted alkyl or aryl), $NH_2$, saturated or unsaturated alkyl, alkoxy, aryl, aroxy, or substituted alkyl or aryl. The alkyl, alkoxy, alkylene, aryl, aroxy chains each contain from 1 to 40 carbon atoms. Additionally, $R_1$ and $R_2$ and $R_3$ and $R_4$ can each form a ring; one example of a ring compound so formed includes, but is not limited to, polyvinyl butyral. Further, $R''_4$ and $R_5$ can form a ring through either nitrogen or oxygen.

Formula (B) is seen to be substantially the same as formula (A), but with some differences in the substituent groups, which provide a homopolymer of these monomers with the higher $T_g$ of at least 25° C.

One preferred embodiment of formula (B) is the following general structure (B1):

where $R'''_5$=hydrogen, alkyl, alkoxy, aryl or halogen; and $R'''_6$=H, aryl, alkyl (with one carbon atom), amino, ester, epoxy component containing groups, and fluoroalkyl derivatives.

Examples for formula (B1) include, but are not limited to;

(B1-1) ethylene;
(B1-2) styrene;
(B1-3) vinyl carbazole;
(B1-4) vinyl naphthalene;
(B1-5) vinyl anthracene;
(B1-6) vinyl pyrene;
(B1-7) methyl methacrylate;
(B1-8) methyl acrylate;
(B1-9) alpha-methyl styrene;
(B1-10) dimethylstyrene;
(B1-11) methylstyrene;
(B1-12) vinylbiphenyl;
(B1-13) glycidyl acrylate;
(B1-14) glycidyl methacrylate;
(B1-15) glycidyl propylene;
(B1-16) 2-methyl-2-vinyl oxirane;
(B1-17) vinyl pyridine;
(B1-18) aminoethyl methacrylate; and
(B1-19) aminoethylphenyl acrylate.

Another preferred embodiment of formula (B) is the following general structure (B2):

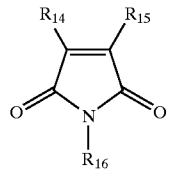

Where $R_{14}$ and $R_{15}$ are independently selected from H, halogen, alkyl, aryl, substituted alkyl and aryl; alternatively, $R_{14}$ and $R_{15}$ are in the form of a closed ring; and $R_{16}$ is H, halogen, alkyl, aryl, substituted alkyl or aryl, or unsaturated alkyl.

Examples for formula (B2) include, but are not limited to:

(B2-1) maleimide;
(B2-2) N-phenyl maleimide;
(B2-3) N-hexyl maleimide;
(B2-4) N-vinylphthalimide; and
(B2-5) N-vinyl maleimide.

As stated above, the C moiety is an optional hydrophilic component. The C moiety is selected from a wide variety of monomers such as poly(ethylene glycol) units having general formula (C1), vinyl pyrrolidones having general formula (C2), vinyl imidazoles having general formula (C3) and acrylamides having general formula (C4), all of which polymerize to form water-soluble polymers.

The general structure of formula (C1) is

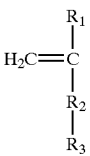

where $R_1$=H, halogen, alkyl, aryl, or substituted alkyl or aryl;

$R_2$=direct bond, O, CO, NH, or CONH;

$R_3$=OH, $(CH_2CH_2O)_yR_4$, $(CH_2CH(CH_3)O)_yR_4$, or $(CH_2CH(C_2H_5)O)_yR_4$ or the thioester analogs: SH, $(CH_2CH_2S)_yR_4$, $(CH_2CH(CH_3)S)_yR_4$ or $(CH_2CH(C_2H_5)S)_yR_4$;

y=1 to 200; and $R_4$=alkyl, aryl, substituted alkyl or aryl.

Examples for general structure (C1) include, but are not limited to:

(C1-1) poly(ethylene glycol) methyl ether acrylate of average molecular weight 404;

(C1-2) poly(ethylene glycol) methyl ether methacrylate of average molecular weight 418;

(C1-3) poly(ethylene glycol) methyl ether methacrylate of average molecular weight 2068;

(C1-4) poly(ethylene glycol) methyl ether acrylate of average molecular weight 2054; and (C1-5) polyvinyl alcohol.

The general structure of formula (C2) is

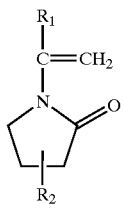

where $R_1$ and $R_2$ are independently selected from —H, halogen, alkyl, aryl, and substituted alkyl and aryl.

Examples for general structure (C2) include, but are not limited to:

(C2-1) vinyl pyrrolidone;

(C2-2) vinyl 4-methylpyrrolidone; and (C2-3) vinyl 4-phenylpyrrolidone.

The general structure of formula (C3) is

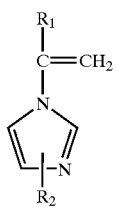

where $R_1$ and $R_2$ are independently selected from H, halogen, alkyl, aryl, and substituted alkyl and aryl.

Examples for general structure (C3) include, but are not limited to:

(C3-1) vinyl imidazole;

(C3-2) vinyl 4-methylimidazole; and (C3-3) vinyl 4-phenylimidazole.

The general structure of formula (C4) is

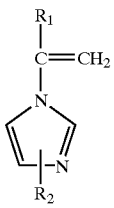

where $R_1$ is H, halogen, alkyl, aryl or substituted alkyl or aryl; and $R_2$ and $R_3$ are independently selected from H, alkyl, aryl and substituted alkyl and aryl; alternatively, $R_2$ and $R_3$ can form a ring, either aliphatic or aromatic.

Examples for the general structure (C4) include, but are not limited to:

(C4-1) acrylamide;

(C4-2) methacrylamide;

(C4-3) N,N-dimethyl acrylamide;

(C4-4) N-methyl acrylamide;

(C4-5) N-methyl methacrylamide;

(C4-6) aryloxy piperidine; and (C4-7) N,N-diethyl acrylamide.

As stated above, the E moiety is a highly polar functional group composed of moieties having the general structure given by formulae (E1) to (E10).

The general structure of formula (E1) is $$CH(R_1)=C(R_2)R_3COOH$$

where $R_1$=H, COOH, $COOR_4$;

$R_2$=COOH, H, halogen, alkyl, aryl, alkoxyl, or substituted alkyl, aryl or alkoxyl;

$R_3$=direct bond, alkylene, arylene or substituted alkylene or arylene; and $R_4$=alkyl, aryl, substituted alkyl or aryl.

Examples for structure (E1) include, but are not limited to:

(E1-1) acrylic acid;

(E1-2) methacrylic acid;

(E1-3) chloromethacrylic acid;

(E1-4) maleic acid;

(E1-5) maleic acid monoethyl ester;

(E1-6) crotonic acid;

(E1-7) itaconic acid and (E1-8) itaconic acid monoethyl ester.

The general structure of formula (E2) is $$CH_2=CHR_1NR_2R_3$$

where $R_1$=alkylene, arylene, substituted alkylene, arylene, or —$SO_2$; and $R_2$ and $R_3$ are independently selected from H, alkyl, aryl, or substituted alkyl, aryl or alkoxyl; alternatively, $R_2$ and $R_3$ can be combined to form a ring, either aliphatic or aromatic.

Examples for structure (E2) include, but are not limited to:

(E2-1) allylamine;
(E2-2) N,N-diethylallylamine; and
(E2-3) vinyl sulfonamide.

The general structure of formula (E3) is

where $R_1$=alkylene, arylene, substituted alkylene or arylene;

y=1 to 4; and $M^{y+}$=$NH_4^+$, $Li^+$, $Na^+$, $K^+$, $Ca^{2+}$, $Mg^{2+}$, $Al^{3+}$, $Ti^{4+}$, triethylammonium, diethylammonium pyrridinium, etc.

Examples for structure (E3) include, but are not limited to:

(E3-1) sodium acrylate;
(E3-2) sodium methacrylate;
(E3-3) ammonium acrylate; and
(E3-4) ammonium methacrylate.

The general structure of formula (E4) is

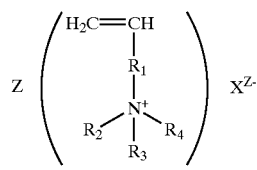

where $R_1$=alkylene, arylene, substituted alkylene or arylene, COO, or cyclic ring containing nitrogen;

$R_2$, $R_3$, and $R_4$ are independently selected from H, alkyl, aryl, alkoxyl, or substituted alkyl, aryl or alkoxyl;

z=1 to 4; and

X=halogen, $BF_4$, $PF_6$, $ClO_4$, SCN, CNO, CNS.

Examples for general structure (E4) include, but are not limited to:

(E4-1) acrylamidopropanetriethylammonium chloride;
(E4-2) methacrylamidopropanetriethylammonium chloride; and
(E4-3) vinylpyridine hydrochloride.

The general structure of formula (E5) is

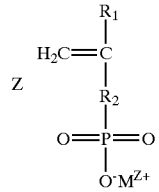

where $R_1$=H, alkyl, aryl, alkoxyl, substituted alkyl, aryl or alkoxyl;

$R_2$=direct bond, alkylene, arylene or substituted alkylene or arylene;

z=1 to 4; and $M^{z+}$=$NH_4^+$, $Li^+$, $Na^+$, $K^+$, $Ca^{2+}$, $Mg^{2+}$, $Al^{3+}$, $Ti_{4+}$, triethylammonium, diethylammonium, pyrridinium, etc.

Examples for the general structure (E5) include, but are not limited to:

(E5-1) sodium vinyl phosphonate; and
(E5-2) sodium 1-methylvinylphosphonate.

The general structure of formula (E6)

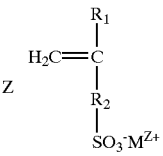

where $R_1$=H, alkyl, aryl, alkoxyl, substituted alkyl, aryl or alkoxyl;

$R_2$=direct bond, —$COOR_3$, arylene, alkylene, or —$CONHR_3$;

$R_3$=alkylene, arylene, substituted alkylene or arylene, or fluoroalkylene;

z=1 to 4; and $M^{z+}$=$NH_4^+$, $Li^+$, $Na^+$, $K^+$, $Ca^{2+}$, $Mg^{2+}$, $Al^{3+}$, $Ti^{4+}$, etc.

Examples for the general structure (E6) include, but are not limited to:

(E6-1) sodium vinyl sulfonate;
(E6-2) sodium 1-methylvinylsulfonate;
(E6-3) sodium styrenesulfonate;
(E6-4) sodium acrylamidopropanesulfonate;
(E6-5) sodium methacrylamidopropanesulfonate; and
(E6-6) sodium vinyl morpholine sulfonate.

Additional E moieties include the following salts:

(E7) sulfonium salts;
(E8) carbonium salts;
(E9) pyrrilinium salt and thio pyrrilinium salt; and
(E10) tetrazolium salt.

The sulfonium salts have the following structure (E7):

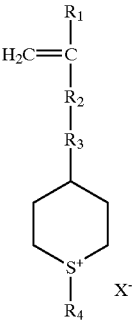

where $R_1$=H, halogen, alkyl, or aryl;

$R_2$=CO, O;

$R_3$=direct bond, NH;

$R_4$=alkyl or aryl; and

X=Cl, Br, $BF_4$, $ClO_4$, I, or $NO_3$.

The carbonium salts have the following structure (E8):

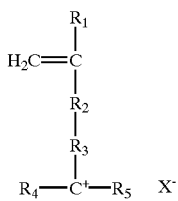

where $R_1$=H, halogen, alkyl, or aryl;
$R_2$=CO, O;
$R_3$=direct bond, NH, alkylene, or arylene;
$R_4$ and $R_5$ are independently selected from alkyl or aryl; and
X=$SbF_5$, $FSO_3$.

The pyrrilinium and thio-pyrrilinium salts have the following structure (E9):

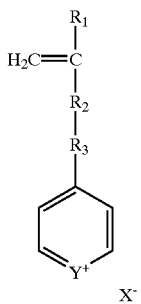

wherein

Y=O or S;
$R_1$=H, halogen, alkyl, or aryl;
$R_2$=CO, O;
$R_3$=direct bond, NH, alkylene, or arylene;
X=Cl, Br, I, $ClO_4$, $BF_4$, etc.

Copolymers that fall within the scope of the formula include, but are not limited to, the following examples, which may be characterized as A-B-E, A-B-C-E, A-E, or B-E polymers,; these copolymers promote adhesion between the media and the overcoat:

P1. (hexyl acrylate)$_{40}$(methyl methacrylate)$_{40}$(acrylic acid)$_{20}$
P2. (hexyl acrylate)$_{60}$ (methyl methacrylate)$_{20}$ (metbacrylic acid)$_{20}$
P3. (hexyl acrylate)$_{40}$(methyl methacrylate)$_{40}$(maleic acid)$_{20}$
P4. (hexyl acrylate)$_{40}$(methyl methacrylate)$_{40}$(vinyl benzoic acid)$_{20}$
P5. (hexyl acrylate)$_{40}$(methyl methacrylate)$_{40}$(vinyl sulfonamide)$_{20}$
P6. (hexyl acrylate)$_{40}$(methyl methacrylate)$_{40}$(sodium acrylate)$_{20}$
P7. (hexyl acrylate)$_{40}$ (methyl methacrylate)$_{40}$ (ammonium acrylate)$_{20}$
P8. (hexyl acrylate)$_{40}$(methyl methacrylate)$_{40}$ (ammonium methacrylate)$_{20}$
P9. (ethyl acrylate)$_{40}$(methyl methacrylate)$_{40}$ (acrylamidopropanetriethylammonium chloride)$_{20}$
P10. (propyl acrylate)$_{40}$(methyl methacrylate)$_{40}$(vinyl pyridine hydrochloride)$_{20}$
P11. (butyl acrylate)$_{40}$(methyl methacrylate)$_{40}$(sodium vinyl phosphate)$_{20}$
P12. (hexyl acrylate)$_{40}$(methyl methacrylate)$_{40}$(sodium styrene sulfonate)$_{20}$
P13. (hexyl acrylate)$_{30}$(methyl methacrylate)$_{50}$(sodium acrylamidopropanesulfonate)$_{20}$
P14. (styrene)$_{80}$(acrylic acid)$_{20}$
P15. (styrene)$_{60}$(acrylic acid)$_{40}$
P16. (styrene)$_{40}$(methyl methacrylate)$_{40}$(acrylic acid)$_{20}$
P17. (ethyl acrylate)$_{60}$(acrylic acid)$_{40}$
P18. (styrene)$_{40}$(ethyl acrylate)$_{40}$(acrylic acid)$_{20}$
P19. (methyl methacrylate)$_{32}$(hexyl acrylate)$_{46}$(poly (ethylene glycol) methyl ether acrylate, mw=404)$_{12}$ (acrylic acid)$_{10}$
P20. (hexyl acrylate)$_{40}$(methyl methacrylate)$_{40}$(sodium xylene sulfonate)$_{20}$

EXAMPLES

Example 1

Preparation of Printing Fluid Additive

One embodiment of the printing fluid additive (Polymer A) was prepared by potassium-persulfate initiated polymerization of four acrylic monomers: methyl methacrylate (MMA), In-hexyl acrylate (HA), methoxy poly(ethylene glycol 350) methacrylate (MPEG(350)MA), and acrylic acid (AA) in the presence of molecular weight modifier (iso-octyl thioglycolate, IOTG) and surfactants (Rhodafac RS 710). The proportion of monomers in the composition was 32/46/12/10 MMA/HA/MPEG(350)MA/M. Prior to neutralization with KOH, the additive was a latex with a particle size of 110 nm and a molecular weight of 20K. The additive was completely soluble at pH 8.5.

Example 2

Another embodiment of the printing fluid additive was prepared by charging 1080.1 g water and 2.4 g potassium persulfate (KP) into a reaction flask. A pre-emulsion was prepared by addition of a mixture of (74.7g MMA, 107.37g HA, 28.01 g MPEG(350) MA, 23.34gAA, 2.39g IOTG and 3.62 g Brij 92) to a solution of 6.54 g Rhodafac RS-710 in 205.6 g water. The reactor phase was heated to 85° C. while degassing with nitrogen. When 85° C. was reached, addition of the monomer feed was started and continued over 150 minutes. When the addition was complete, the mixture was allowed to stir at 85° C. for 10 hours. The product was filtered through a 1 μm glass microfiber filter. Neutralization to pH ~8.5 was done with a 50% solution of KOH.

Example 3

Ink was prepared having 2% of Polymer A having the composition and characteristics given in Tables 3a and 3b below. A Control ink without Polymer A was also prepared. Both inks (the ink with Polymer A and the Control Ink) were used to fill inkjet pens.

Example 4

Ink was prepared with 0.5% of Polymer A having the composition and characteristics given in Tables 4a and 4b below. The ink was used to fill inkjet pens.

Example 5

Ink was prepared with 1.0% of Polymer A having the composition and characteristics given in Tables 5a and 5b below. The ink was used to fill inkjet pens.

Example 6

Ink was prepared with 1.5% of Polymer A having the composition and characteristics given in Tables 6a and 6b below. The ink was used to fill inkjet pens.

Example 7

Pens with the examples I through 6 ins were used to print on both large format and home format gelatin-based, hydrophilic material-coated, photo inkjet media for evaluation of top coating adhesion on color digital prints.

Example 8

A clear thermal transfer overcoat was applied to prints with inks having 0.0%, 0.5%, 1.0%, 1.5% and 2.0% polymer A on both both large format and home format gelatin-based, hydrophilic material-coated, photo inkjet media. When light rubbing with a fingernail was applied to the overcoated prints printed on either media with the ink having 0.0% Polymer A, the prints were marked readily by a fingernail rub and the overcoat separated readily from the print. When such light rubbing with a fingernail was applied to overcoated prints printed with ink having 2.0% Polymer A, the prints did not mark or the overcoat separate from the print. When the same fingernail test was applied to prints printed with ink having 0.5, 1.0 and 1.5% Polymer A, it was found that adhesion of the overcoat to the print and resistance to marking with a fingernail rub increase with increasing content of Polymer A. Adhesion at less than 2% polymer was not acceptable for the desired protection.

TABLE 2

| Materials | % | Concentrate | K | Y | M-D | M-L | C-D | C-L | Totals |
|---|---|---|---|---|---|---|---|---|---|
| | | | \multicolumn{6}{c}{Ink grams to make =} | |
| | | | 25 | 25 | 25 | 25 | 25 | 25 | |
| 1,2-Hexanediol | 11.50 | 19.550 | 2.875 | 2.875 | 2.875 | 2.875 | 2.875 | 2.875 | |
| Dipropylene glycol monobutyl ether | 0.50 | 0.850 | 0.125 | 0.125 | 0.125 | 0.125 | 0.125 | 0.125 | |
| Tergitol 15-S-7 | 0.25 | 0.425 | 0.063 | 0.063 | 0.063 | 0.063 | 0.063 | 0.063 | |
| Tergitol 15-S-5 | 0.25 | 0.425 | 0.063 | 0.063 | 0.063 | 0.063 | 0.063 | 0.063 | |
| DI Water | 25.00 | 42.500 | 6.250 | 6.250 | 6.250 | 6.250 | 6.250 | 6.250 | |
| Polymer A (22%) | 18.18 | 30.906 | 4.545 | 4.545 | 4.545 | 4.545 | 4.545 | 4.545 | |
| TOTAL | 56.13 | 95.421 | 14.033 | 14.033 | 14.033 | 14.033 | 14.033 | 14.033 | |
| Vehicle Concentrate | | | 14.033 | 14.033 | 14.033 | 14.033 | 14.033 | 14.033 | 84.195 |
| Dye Solution | | | 6.312 | 3.116 | 3.355 | 0.503 | 4.405 | 0.661 | 18.352 |
| DI Water | | | 4.656 | 7.702 | 7.612 | 10.464 | 6.562 | 10.307 | 47.303 |
| INK TOTAL | | | 25.000 | 25.000 | 25.000 | 25.000 | 25.000 | 25.000 | 150.000 |

TABLE 3

| Materials | % | Concentrate | K | Y | M-D | M-L | C-D | C-L | Totals |
|---|---|---|---|---|---|---|---|---|---|
| | | | \multicolumn{6}{c}{Ink grams to make =} | |
| | | | 40 | 40 | 40 | 40 | 40 | 40 | |
| 1,2-Hexanediol | 11.50 | 28.750 | 4.600 | 4.600 | 4.600 | 4.600 | 4.600 | 4.600 | |
| Dipropylene glycol monobutyl ether | 0.50 | 1.250 | 0.200 | 0.200 | 0.200 | 0.200 | 0.200 | 0.200 | |
| Tergitol 15-S-7 | 0.25 | 0.625 | 0.100 | 0.100 | 0.100 | 0.100 | 0.100 | 0.100 | |
| Tergitol 15-S-5 | 0.25 | 0.625 | 0.100 | 0.100 | 0.100 | 0.100 | 0.100 | 0.100 | |
| DI Water | 25.00 | 62.500 | 10.000 | 10.000 | 10.000 | 10.000 | 10.000 | 10.000 | |
| Polymer A (22%) | 9.09 | 22.725 | 3.636 | 3.636 | 3.636 | 3.636 | 3.636 | 3.636 | |
| TOTAL | 47.04 | 117.600 | 18.816 | 18.816 | 18.816 | 18.816 | 18.816 | 18.816 | |
| Vehicle Concentrate | | | 18.816 | 18.816 | 18.816 | 18.816 | 18.816 | 18.816 | 112.896 |
| Dye Solution | | | 10.099 | 4.985 | 5.369 | 0.0805 | 7.048 | 1.057 | 29.363 |
| DI Water | | | 11.085 | 15.959 | 15.815 | 20.379 | 14.136 | 20.127 | 97.501 |
| INK TOTAL | | | 40.000 | 40.000 | 40.000 | 40.000 | 40.000 | 40.000 | 240.000 |

TABLE 4

| Materials | % | Concentrate | K | Y | M-D | M-L | C-D | C-L | Totals |
|---|---|---|---|---|---|---|---|---|---|
| | | | \multicolumn{6}{c}{Ink grams to make =} | |
| | | | 40 | 40 | 40 | 40 | 40 | 40 | |
| 1,2-Hexanediol | 11.50 | 28.750 | 4.600 | 4.600 | 4.600 | 4.600 | 4.600 | 4.600 | |
| Dipropylene glycol monobutyl ether | 0.50 | 1.250 | 0.200 | 0.200 | 0.200 | 0.200 | 0.200 | 0.200 | |
| Tergitol 15-S-7 | 0.25 | 0.625 | 0.100 | 0.100 | 0.100 | 0.100 | 0.100 | 0.100 | |
| Tergitol 15-S-5 | 0.25 | 0.625 | 0.100 | 0.100 | 0.100 | 0.100 | 0.100 | 0.100 | |

TABLE 4-continued

| | | | K | Y | M-D | M-L | C-D | C-L | |
| | | | | | Ink grams to make = | | | | |
| Materials | % | Concentrate | 40 | 40 | 40 | 40 | 40 | 40 | Totals |
|---|---|---|---|---|---|---|---|---|---|
| DI Water | 25.00 | 62.500 | 10.000 | 10.000 | 10.000 | 10.000 | 10.000 | 10.000 | |
| Polymer A (22%) | 2.27 | 5.675 | 0.908 | 0.908 | 0.908 | 0.908 | 0.908 | 0.908 | |
| TOTAL | 40.22 | 100.550 | 16.088 | 16.088 | 16.088 | 16.088 | 16.088 | 16.088 | |
| Vehicle Concentrate | | | 16.088 | 16.088 | 16.088 | 16.088 | 16.088 | 16.088 | 96.528 |
| Dye Solution | | | 10.099 | 4.985 | 5.369 | 0.805 | 7.048 | 1.057 | 29.363 |
| DI Water | | | 13.813 | 18.687 | 18.543 | 23.107 | 16.864 | 22.855 | 113.869 |
| INK TOTAL | | | 40.000 | 40.000 | 40.000 | 40.000 | 40.000 | 40.000 | 240.000 |

TABLE 5

| | | | K | Y | M-D | M-L | C-D | C-L | |
| | | | | | Ink grams to make = | | | | |
| Materials | % | Concentrate | 40 | 40 | 40 | 40 | 40 | 40 | Totals |
|---|---|---|---|---|---|---|---|---|---|
| 1,2-Hexanediol | 11.50 | 28.750 | 4.600 | 4.600 | 4.600 | 4.600 | 4.600 | 4.600 | |
| Dipropylene glycol monobutyl ether | 0.50 | 1.250 | 0.200 | 0.200 | 0.200 | 0.200 | 0.200 | 0.200 | |
| Tergitol 15-S-1 | 0.25 | 0.625 | 0.100 | 0.100 | 0.100 | 0.100 | 0.100 | 0.100 | |
| Tergitol 15-S-5 | 0.25 | 0.625 | 0.100 | 0.100 | 0.100 | 0.100 | 0.100 | 0.100 | |
| Dl Water | 25.00 | 62.500 | 10.000 | 10.000 | 10.000 | 10.000 | 10.000 | 10.000 | |
| Polymer A (22%) | 4.54 | 11.350 | 1.816 | 1.816 | 1.816 | 1.816 | 1.816 | 1.816 | |
| TOTAL | 42.49 | 106.225 | 16.996 | 16.996 | 16.996 | 16.996 | 16.996 | 16.996 | |
| Vehicle Concentrate | | | 16.996 | 16.996 | 16.996 | 16.996 | 16.996 | 16.996 | 101.976 |
| Dye Solution | | | 10.099 | 4.985 | 5.369 | 0.805 | 7.048 | 1.057 | 29.363 |
| DI Water | | | 12.905 | 17.779 | 17.635 | 22.199 | 15.956 | 21.947 | 108.421 |
| INK TOTAL | | | 40.000 | 40.000 | 40.000 | 40.000 | 40.000 | 40.000 | 240.000 |

TABLE 6

| | | | K | Y | M-D | M-L | C-D | C-L | |
| | | | | | Ink grams to make = | | | | |
| Materials | % | Concentrate | 40 | 40 | 40 | 40 | 40 | 40 | Totals |
|---|---|---|---|---|---|---|---|---|---|
| 1,2-Hexanediol | 11.50 | 28.750 | 4.600 | 4.600 | 4.600 | 4.600 | 4.600 | 4.600 | |
| Dipropylene glycol monobutyl ether | 0.50 | 1.250 | 0.200 | 0.200 | 0.200 | 0.200 | 0.200 | 0.200 | |
| Tergitol 15-S-7 | 0.25 | 0.625 | 0.100 | 0.100 | 0.100 | 0.100 | 0.100 | 0.100 | |
| Tergitol 15-S-5 | 0.25 | 0.625 | 0.100 | 0.100 | 0.100 | 0.100 | 0.100 | 0.100 | |
| DI Water | 25.00 | 62.500 | 10.000 | 10.000 | 10.000 | 10.000 | 10.000 | 10.000 | |
| Polymer A (22%) | 6.82 | 17.050 | 2.728 | 2.728 | 2.728 | 2.728 | 2.728 | 2.728 | |
| TOTAL | 44.77 | 111.925 | 17.908 | 17.908 | 17.908 | 17.908 | 17.908 | 17.908 | |
| Vehicle Concentrate | | | 17.908 | 17.908 | 17.908 | 17.908 | 17.908 | 17.908 | 107.448 |
| Dye Solution | | | 10.099 | 4.985 | 5.369 | 0.805 | 7.048 | 1.057 | 29.363 |
| DI Water | | | 11.993 | 16.867 | 16.723 | 21.287 | 15.044 | 21.035 | 102.949 |
| INK TOTAL | | | 40.000 | 40.000 | 40.000 | 40.000 | 40.000 | 40.000 | 240.000 |

While the foregoing invention has been described in some detail for purposes of clarity and understanding, it will be clear to one skilled in the art from the reading of this disclosure that various changes in form and detail can be made without departing from the true scope of the invention.

What is claimed is:

1. A method of using adhesion promoters in printing fluids to improve adhesion of clear thermal transfer overcoats to hydrophilic-material coated medium, comprising
   (a) printing an printing fluid composition comprising an acrylic copolymer additive onto a hydrophilic-material coated medium; and
   (b) applying a clear thermal transfer overcoat to the hydrophilic-material coated medium printed in step (a); wherein the acrylic copolymer additive in the printing fluid composition is in an amount sufficient to promote adhesion of clear thermal transfer overcoat applied over an image printed with the printing fluid composition.

2. The method of claim 1 wherein the acrylic copolymer is derived from both a hydrophilic monomer and a hydrophobic monomer, the acrylic copolymer having a formula

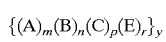

wherein A, B, C, and E are monomers as follows

A=at least one hydrophobic component contributing to improved durable, film-forming properties selected from moieties which, when homo-polymerized to a solid state, have a glass transition temperature ($T_g$) in the range between −150° and +25° C.;

B=at least one hydrophobic and solvent barrier moiety used to adjust the $T_g$ of the hydrophobic component of the polymer which, when homopolymerized to a solid state, has a $T_g$ greater than +25° C.;

C=at least one hydrophilic component comprising a water-soluble monomer;

E=at least one moiety having at least one highly polar functional group;

and where m, n, p and r are as follows:
m=0 to 90 wt %;
n=0 to 90 wt %;
p=0 to 90 wt %;
r=0 to 90 wt %;
m+n+p+r=100 wt %; and
y=1 to 100,000.

3. The method of claim 2, wherein the A monomer is:

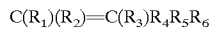

$C(R_1)(R_2)=C(R_3)R_4R_5R_6$ where $R_1$ and $R_2$ are independently hydrogen, halogen, alkyl, aryl, or substituted alkyl or aryl;

$R_3$ is hydrogen, halogen, saturated or unsaturated alkyl, alkoxy, aryl, or substituted alkyl, alkoxy, or aryl;

$R_4$ is direct bond, O, CO, NH, halogen, saturated or unsaturated alkyl, aryl, or substituted alkyl, aryl, or CN;

with the proviso that if $R_4$ is alkyl, aryl, or substituted alkyl or aryl then $R_5$ is absent), otherwise $R_5$ is direct bond, hydrogen, NH, O, alkyl, alkylene, aryl, or substituted alkyl, alkylene, or aryl, and with the proviso that if $R_4$ is alkyl, aryl, or substituted alkyl or aryl or if $R_5$ is hydrogen, alkyl, aryl, or substituted alkyl or aryl, then $R_6$ is absent, otherwise $R_6$ is $NH_2$, saturated or unsaturated alkyl, alkoxy, aryl, aroxy, or substituted alkyl or aryl and wherein the alkyl, alkoxy, alkylene, and aryl chains each contain more than one carbon atom and less than 40 carbon atoms.

4. The method of claim 3 wherein the A monomer is

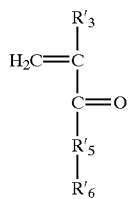

where
$R'_3$=H, halogen, alkyl, aryl or substituted alkyl or aryl;
$R'_5$=direct bond, O, or NH; and
$R'_6$=alkyl, substituted alkyl, alkylaryl or substituted alkylaryl and aralkyl in which the length of alkyl, alkylaryl or aralkyl chain is given as the number of carbon atoms between 2 and 18; and alkyl or aryl siloxanes.

5. The method of claim 4 wherein the A monomer is selected from the group consisting of ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; 3-methacryloxypropyldimethylmethoxysilane; 3-methacryloxypropyldimethylmethoxysilane; 3-methacryloxypropylpentamethyldisiloxane; 3-methacryloxypropyltris(trimethylsiloxy)silane; 3-acryloxypropyldimethy,methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; iso-butyl acrylate; iso-butyl methacrylate; 2-ethylhexyl acrylate; 2-ethylhexyl methacrylate; iso-octyl acrylate; and iso-octyl methacrylate.

6. The method of claim 5 wherein the A monomer is

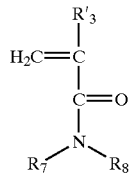

where
$R'_3$=H, halogen, alkyl, aryl or substituted alkyl or aryl; and
$R_7=R_8$=same or different combinations of alkyl, substituted alkyl, alkylaryl or substituted alkylaryl and aralkyl in which the length of alkyl, alkylaryl or aralkyl chain is given as the number of carbon atoms between 2 and 18; and alkyl or aryl siloxanes.

7. The method of claim 6 wherein the A monomer is selected from the group consisting of:
N,N-dihexyl acrylamide; N,N-dioctyl acrylamide.

8. The method of 5 wherein the A monomer is

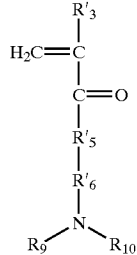

where $R'_3$=H, halogen, alkyl, aryl or substituted alkyl or aryl;
$R'_5$=direct bond, O, or NH; and
$R'_6$=alkylene, arylene, substituted alkylene or arylene; and
$R_9$ and $R_{10}$ are independently selected from H, alkyl, substituted alkyl, alkylaryl or substituted alkylaryl in which the length of alkyl and alkylaryl chains each comprise between 2 and 40 carbon atoms, or $R_9$ and $R_{10}$ together form a 5- or 6-membered ring.

9. The method of claim 8 wherein the monomer A is selected from the group consisting of:

aminoethyl acrylate; aminiopropyl acrylate; aminopropyl methacrylate; aminoisopropyl acrylate; aminoisopropyl methacrylate; aminobutyl acrylate; aminobutyl methacrylate; aminohexyl acrylate; aminohexyl methacrylate; amino octadecyl methacrylate; aminooctadecyl acrylate; aminolauryl methacrylate; aminolauryl acrylate; N,N-dimethylaminoethyl acrylate; N,N-dimethylaminoethyl methacrylate; N,N-diethylaminoethyl acrylate; N,N-dimethylaminoethyl methacrylate; and piperidino-N-ethyl acrylate.

10. The method of claim 5 wherein the monomer A is

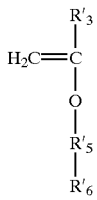

where: $R'_3$=H, halogen, alkyl, aryl, substituted alkyl or aryl;

$R'_5$=direct bond, CO, alkylene, arylene, substituted alkylene or arylene;

and $R'_6$=alkyl, aryl, substituted alkyl or aryl.

11. The method of claim 10 wherein the monomer A is selected from the group consisting of:

vinyl propionate; vinyl acetate; vinyl butyrate; vinyl butyl ether; vinyl propyl ether; vinyl neodecanoate; vinyl neononate and vinyl pivalate.

12. The method of claim 2, wherein the B monomer is:

$$CR_1R_2=C(R_3)R''_4R''_5R''_6$$

where $R_1$ and $R_2$ are independently selected from hydrogen, or halogen;

$R_3$ is hydrogen, halogen, saturated or unsaturated alkyl, alkoxy, aryl, or substituted alkyl, alkoxy, or aryl;

$R_4$ is direct bond, O, CO, NH, halogen, saturated or unsaturated alkyl, aryl, or substituted alkyl, aryl, or CN, with the proviso that if $R_4$ is CN, alkyl, aryl, or substituted alkyl or aryl then $R_5$ is absent; otherwise $R_5$ is direct bond, hydrogen, NH, O, alkyl, alkylene, aryl, or substituted alkyl, alkylene, or aryl, and with the proviso that if $R_4$ is alkyl, aryl, or substituted alkyl or aryl or if $R_5$ is hydrogen, alkyl, aryl, or substituted alkyl or aryl then $R_6$ is absent; otherwise $R_6$ is $NH_2$, saturated or unsaturated alkyl, alkoxy, aryl, aroxy, or substituted alkyl or aryl and where the alkyl, alkoxy, alkylene, aryl, aroxy chains each contain from 1 to 20 carbon atoms;

where $R_1$ and $R_2$ and $R_2$ and $R_3$ can each form a ring; and where $R''_4$ and $R_5$ can form a ring through nitrogen or oxygen.

13. The method of claim 12 wherein the monomer B is $$CH_2=CR'''_5R'''_6$$

where
$R'''_5$=hydrogen, alkyl, alkoxy, aryl or halogen; and
$R'''_6$=H, aryl, alkyl (with one carbon atom), amino, ester, epoxy component containing groups, and fluoroalkyl derivatives.

14. The method of claim 13 wherein the monomer B is selected from the group consisting of ethylene; styrene; vinyl carbazole; vinyl naphthalene; vinyl anthracene; vinyl pyrene; methyl methacrylate; methyl acrylate; alpha-methyl styrene; dimethylstyrene; methylstyrene; vinylbiphenyl; glycidyl acrylate; glycidyl methacrylate; glycidyl propylene; 2-methyl-2-vinyl oxirane; vinyl pyridine; aminoethyl methacrylate; and aminoethylphenyl acrylate.

15. The method of claim 12 wherein the monomer B is

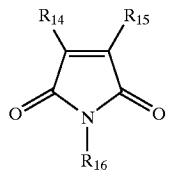

where $R_{14}$ and $R_{15}$ are independently selected from H, halogen, alkyl, aryl, substituted alkyl and aryl, or, $R_{14}$ and $R_{15}$ are in the form of a closed ring; and $R_{16}$ is H, halogen, alkyl, aryl, substituted alkyl or aryl, or unsaturated alkyl.

16. The method of claim 15, wherein the monomer B is selected from the group consisting of:

maleimide; N-phenyl maleimide; N-hexyl maleimide; N-vinylphthalimide; and N-vinyl maleimide.

17. The method of claim 2 wherein the monomer C is

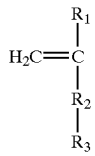

where $R_1$ is H, halogen, alkyl, aryl, or substituted alkyl or aryl;

$R_2$ is direct bond, O, CO, NH, or CONH;

$R_3$ is OH, $(CH_2CH_2O)_yR_4$, $(CH_2CH(CH_3)O)_yR_4$, or $(CH_2CH(C_2H_5)O)_yR_4$, SH, $(CH_2CH_2S)_yR_4$, $(CH_2CH(CH_3)S)_yR_4$ or $(CH_2CH(C_2H_5)S)_yR_4$;

y=1 to 200; and $R_4$=alkyl, aryl, substituted alkyl or aryl.

18. The method of claim 17 wherein the C monomer is selected from the group consisting of:

poly(ethylene glycol) methyl ether acrylate of average molecular weight 404;

poly(ethylene glycol) methyl ether methacrylate of average molecular weight 418;

poly(ethylene glycol) methyl ether methacrylate of average molecular weight 2068;

poly(ethylene glycol) methyl ether acrylate of average molecular weight 2054; and polyvinyl alcohol.

19. The method of claim 2 wherein the C monomer is

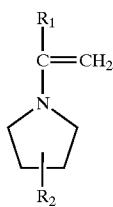

where $R_1$ and $R_2$ are independently selected from —H, halogen, alkyl, aryl, and substituted alkyl and aryl.

20. The method of claim 19 wherein the C monomer is selected from the group consisting of:

vinyl pyrrolidone; vinyl 4-methylpyrrolidone; and vinyl 4-phenylpyrrolidone.

21. The method of claim 2 wherein the C monomer is

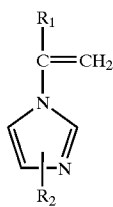

where $R_1$ and $R_2$ are independently selected from H, halogen, alkyl, aryl, and substituted alkyl and aryl.

22. The method of claim 21 wherein the monomer C is selected from the group consisting of:

vinyl imidazole; vinyl 4-methylimidazole; and vinyl 4-phenylimidazole.

23. The method of claim 2 wherein the monomer C is selected from the group consisting of:

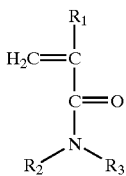

where $R_1$ is H, halogen, alkyl, aryl or substituted alkyl or aryl; and $R_2$ and $R_3$ are independently selected from H, alkyl, aryl and substituted alkyl and aryl; or, $R_2$ and $R_3$ can form a ring, either aliphatic or aromatic.

24. The method of claim 23 wherein the monomer C is selected from the group consisting of:

acrylamide; methacrylamide; N,N-dimethyl acrylamide; N-methyl acrylamide; N-methyl methacrylamide; aryloxy piperidine; and N,N-diethyl acrylamide.

25. The printing fluid composition of claim 2, wherein the monomer E is $$CH(R_1)=C(R_2)R_3COOH$$

where $R_1$=H, COOH, COOR$_4$;

$R_2$=COOH, H, halogen, alkyl, aryl, alkoxyl, or substituted alkyl, aryl or alkoxyl;

$R_3$=direct bond, alkylene, arylene or substituted alkylene or arylene; and $R_4$=alkyl, aryl, substituted alkyl or aryl.

26. The method of claim 25 wherein the E monomer is selected from the group consisting of:

acrylic acid; methacrylic acid; chloromethacrylic acid; maleic acid; maleic acid monoethyl ester; crotonic acid; itaconic acid and itaconic acid monoethyl ester.

27. The method of claim 2 wherein the E monomer is: $CH_2=CHR_1NR_2R_3$ where $R_1$=alkylene, arylene, substituted alkylene, arylene, or —SO$_2$; and $R_2$ and $R_3$ are independently selected from H, alkyl, aryl, or substituted alkyl, aryl or alkoxyl;

or, $R_2$ and $R_3$ are combined to form a ring, either aliphatic or aromatic.

28. The method of claim 27, wherein the E monomer is selected from the group consisting of:

allylamine; N,N-diethylallylamine; and vinyl sulfonamide.

29. The method of claim 2, wherein the E monomer is $$y(CH_2=CHR_1COO^-)M^{y+}$$

where $R_1$=alkylene, arylene, substituted alkylene or arylene;

y=1 to 4; and $M^{y+}$=NH$_4^+$, Li$^+$, Na$^+$, K$^+$, Ca$^{2+}$, Mg$^{2+}$, Al$^{3+}$, Ti$^{4+}$, triethylammonium, diethylammonium, and pyrridinium.

30. The method of claim 29 wherein the E monomer is selected from the group consisting of sodium acrylate; sodium methacrylate; ammonium acrylate; and ammonium methacrylate.

31. The method of claim 2 wherein the E monomer is

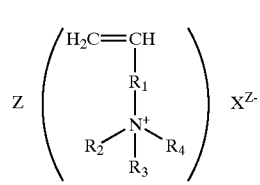

where $R_1$=alkylene, arylene, substituted alkylene or arylene, COO, or cyclic ring containing nitrogen;

$R_2$, $R_3$, and $R_4$ are independently selected from H, alkyl, aryl, alkoxyl, or substituted alkyl, aryl or alkoxyl;

z=1 to 4; and

X=halogen, BF$_4$, PF$_6$, ClO$_4$, SCN, CNO, CNS.

32. The method of claim 31, wherein the E monomer is selected from the group consisting of:

acrylamidopropanetriethylammonium chloride; methacrylamidopropanetriethylammonium chloride; and vinylpyridine hydrochloride.

33. The method of claim 2 wherein the E monomer is selected from the group consisting of:

$$H_2C=\overset{R_1}{\underset{\underset{\underset{O^-M^{Z+}}{|}}{\overset{|}{O=P=O}}}{\overset{|}{\underset{|}{C}}}}$$
Z— (attached to C)

where $R_1$=H, alkyl, aryl, alkoxyl, substituted alkyl, aryl or alkoxyl;

$R_2$=direct bond, alkylene, arylene or substituted alkylene or arylene;

z=1 to 4; and $M^{z+}$=$NH_4^+$, $Li^+$, $Na^+$, $K^+$, $Ca^{2+}$, $Mg^{2+}$, $Al^{3+}$, $Ti^{4+}$, triethylammonium, diethylammonium, and pyrridinium.

34. The method of claim 33, wherein the E monomer is selected from the group consisting of:

sodium vinyl phosphonate; and sodium 1-methylvinylphosphonate.

35. The method of claim 2 wherein the E monomer is $$H_2C=\overset{R_1}{\underset{\underset{SO_3^-M^{Z+}}{|}}{\overset{|}{\underset{|}{\underset{R_2}{C}}}}}$$
Z— where $R_1$=H, alkyl, aryl, alkoxyl, substituted alkyl, aryl or alkoxyl;

$R_2$=direct bond, —$COOR_3$, arylene, alkylene, or —$CONHR_3$;

$R_3$=alkylene, arylene, substituted alkylene or arylene, or fluoroalkylene;

z=1 to 4; and $M^{z+}$=$NH_4^+$, $Li^+$, $Na^+$, $K^+$, $Ca^{2+}$, $Mg^{2+}$, $Al^{3+}$, or $Ti^{4+}$.

36. The method of claim 35 wherein the E monomer is selected from the group consisting of:

sodium vinyl sulfonate; sodium 1-methylvinylsulfonate; sodium styrenesulfonate; sodium acrylamidopropanesulfonate; sodium methacrylamidopropanesulfonate; and sodium vinyl morpholine sulfonate.

37. The method of claim 2 wherein the E monomer is selected from the salts consisting of:

sulfonium salts; carbonium salts; pyrrilinium salt and thio pyrrilinium salt; and tetrazolium salt.

38. The method of claim 37, wherein the sulfonium salt is $$H_2C=\overset{R_1}{\underset{\underset{\underset{\underset{R_4}{|}}{S^+}}{\overset{|}{\underset{|}{\underset{R_3}{\overset{|}{\underset{|}{C}}}}}}}}$$ (cyclohexyl ring with S+) $X^-$ where $R_1$=H, halogen, alkyl, or aryl;

$R_2$=CO, O;

$R_3$=direct bond, NH;

$R_4$=alkyl or aryl; and

X=Cl, Br, $BF_4$, $ClO_4$, I, or $NO_3$.

39. The method of claim 37, wherein the carbonium salt is $$H_2C=\overset{R_1}{\underset{\underset{R_4-\overset{+}{C}-R_5}{\overset{|}{\underset{|}{\underset{R_3}{\overset{|}{\underset{|}{\underset{R_2}{C}}}}}}}}{}} \quad X^-$$

where $R_1$=H, halogen, alkyl, or aryl;

$R_1$=CO, O;

$R_3$=direct bond, NH, alkylene, or arylene;

$R_4$ and $R_5$ are independently selected from alkyl or aryl; and

X=$SbF_5$, $FSO_3$.

40. The method of claim 37, wherein the pyrrilinium and thio-pyrrilinium salts are:

$$H_2C=\overset{R_1}{\underset{\underset{}{\overset{|}{\underset{|}{\underset{R_3}{\overset{|}{\underset{|}{\underset{R_2}{C}}}}}}}}{}}$$ (pyridinium ring with $Y^+$) $X^-$ wherein $R_1$=H, halogen, alkyl, or aryl;

$R_2$=CO, O;

$R_3$=direct bond, NH, alkylene, or arylene;

X=Cl, Br, I, $ClO_4$, and $BF_4$.

41. The method of claim 1 wherein the acrylic copolymer is a mixture prepared by polymerization of acrylic monomers selected from the group consisting of an alkyl methacrylate, an alkyl acrylate, a glycol methacrylate, an alkenyl carboxylic acid, a styrene and combinations and derivatives thereof.

42. The method of claim 41 wherein the alkyl methacrylate is selected from the group consisting of methyl methacrylate, ethyl methacrylate, propyl methacrylate, butyl methacrylate, pentyl methacrylate, hexyl methacrylate, heptyl methacrylate, octyl methacrylate and combinations thereof.

43. The method of claim 41 wherein the alkyl acrylate is selected from the group consisting of methyl acrylate, ethyl acrylate, propyl acrylate, butyl acrylate, pentyl acrylate, hexyl acrylate, heptyl acrylate, octyl acrylate and combinations thereof.

44. The method of claim 41 wherein the glycol methacrylate is selected from the group consisting of esters of methacrylic acid with polyethylene glycol, esters of methacrylic acid with methoxy polyethylene glycol, esters of methacrylic acid with polypropylene glycol, esters of methacrylic acid with methoxy polypropylene glycol and combinations thereof.

45. The method of claim 41 wherein the glycol acrylate is selected from the group consisting of esters of acrylic acid with polyethylene glycol, esters of acrylic acid with methoxy polyethylene glycol, esters of acrylic acid with poly propylene glycol, esters of acrylic acid with methoxy polypropylene glycol and combinations thereof.

46. The method of claim 41 wherein the alkenyl carboxylic acid is selected from the group consisting of itaconic acid, acrylic acid, methacrylic acid, maleic acid derived from maleic anhydride, half acids of maleic acid, and combinations thereof.

47. The method of claim 41 wherein the polymerization of the acrylic monomers is initiated by potassium persulfate, ammonium persulfate, sodium persulfate and water soluble, and organic azo initiators.

48. The method of claim 41 wherein the polymerization of the acrylic monomers is initiated in the presence of surfactants.

49. The method of claim 48 wherein at least one of the surfactants are selected from the group consisting of alkylphosphate and dialkylphosphate and mixtures thereof.

50. The method of claim 49 wherein the polyalkyl phosphate is selected from the group consisting of alkyl ethylene and alkyl polyethylene glycol phosphate.

51. The method of claim 41 wherein the acrylic copolymer is from 30 to 35 wt percent alkyl methacrylate.

52. The method of claim 41 wherein the acrylic copolymer is from 10 to 15 weight percent glycol methacrylate.

53. The method of claim 41 wherein the acrylic copolymer is from 8 to 13 weight percent alkenyl carboxylic acid.

54. The method of claim 41 wherein the acrylic copolymer is soluble in aqueous solution at alkaline pH.

55. The method of claim 41 wherein the acrylic copolymer primer is present in the printing fluid composition in an amount so that when the clear thermal transfer overcoat is applied over an image printed with the printing fluid composition on media having a coating comprising hydrophilic material, the clear thermal transfer overcoat does not separate from the printed medium when lightly rubbed with a fingernail.

56. The method of claim 41 wherein the acrylic copolymer is from 1 to 20 weight percent of the printing fluid composition.

57. The method of claim 1 wherein the printing fluid composition is an ink.

58. The method of claim 1 wherein the hydrophilic material coating the medium is selected from the group consisting of gelatin, polyvinyl alcohol and swellable material.

59. The method of claim 58 wherein the hydrophophilic material is a gelatin material.

* * * * *

UNITED STATES PATENT AND TRADEMARK OFFICE
CERTIFICATE OF CORRECTION

PATENT NO.    : 6,610,412 B2
DATED         : August 26, 2003
INVENTOR(S)   : Ungefug It is certified that error appears in the above-identified patent and that said Letters Patent is hereby corrected as shown below:

<u>Column 30,</u>
After line 58, insert the following additional line -- Y = O or S; --.

Signed and Sealed this

Fourth Day of May, 2004

JON W. DUDAS
*Acting Director of the United States Patent and Trademark Office*